US011071943B2

(12) United States Patent
Miyamoto et al.

(10) Patent No.: US 11,071,943 B2
(45) Date of Patent: Jul. 27, 2021

(54) ABSORPTION LIQUID REGENERATION APPARATUS, $CO_2$ RECOVERY APPARATUS INCLUDING THE SAME, AND ABSORPTION LIQUID REGENERATION METHOD

(71) Applicant: Mitsubishi Heavy Industries Engineering, Ltd., Kanagawa (JP)

(72) Inventors: Osamu Miyamoto, Houston, TX (US); Takashi Kamijo, Kanagawa (JP); Tatsuya Tsujiuchi, Tokyo (JP)

(73) Assignee: Mitsubishi Heavy Industries Engineering, Ltd., Kanagawa (JP)

( * ) Notice: Subject to any disclaimer, the term of this patent is extended or adjusted under 35 U.S.C. 154(b) by 308 days.

(21) Appl. No.: 16/156,017

(22) Filed: Oct. 10, 2018

(65) Prior Publication Data

US 2020/0114305 A1   Apr. 16, 2020

(51) Int. Cl.
*B01D 53/14* (2006.01)
*B01D 53/26* (2006.01)

(52) U.S. Cl.
CPC ..... *B01D 53/1425* (2013.01); *B01D 53/1418* (2013.01); *B01D 53/1475* (2013.01);
(Continued)

(58) Field of Classification Search
CPC .......... B01D 2256/22; B01D 2257/504; B01D 53/1418; B01D 53/1425; B01D 53/1475;
(Continued)

(56) References Cited

U.S. PATENT DOCUMENTS 9,050,555 B2   6/2015  Iijima
9,157,353 B2*  10/2015 Hodotsuka ......... B01D 53/1475
(Continued)

FOREIGN PATENT DOCUMENTS

JP    2008-126154 A   6/2008
JP    2012-223661 A   11/2012
(Continued)

OTHER PUBLICATIONS

International Search Report and Written Opinion in corresponding International Application No. PCT/JP2019/038274, dated Dec. 17, 2019 (12 pages).

*Primary Examiner* — Cabrena Holecek
(74) *Attorney, Agent, or Firm* — Osha Bergman Watanabe & Burton LLP

(57) ABSTRACT

An absorption liquid regeneration apparatus includes: a regeneration tower for regenerating a $CO_2$ absorption liquid; a reflux water drum configured to separate released gas from the regeneration tower into $CO_2$ gas and condensed water, and return the condensed water to the regeneration tower; and a cleaning part installed in a gas-phase part of the reflux water drum or in a $CO_2$ flow passage through which the $CO_2$ gas having flowed from the gas-phase part flows, and configured to remove a $CO_2$ absorption agent contained in the $CO_2$ gas by using a cleaning liquid. The cleaning liquid has a lower concentration of the $CO_2$ absorption agent than the condensed water stored in a liquid-phase part of the reflux water drum.

11 Claims, 6 Drawing Sheets

(52) U.S. Cl.
CPC ........ *B01D 53/265* (2013.01); *B01D 2256/22* (2013.01); *B01D 2257/504* (2013.01)

(58) Field of Classification Search
CPC ...... B01D 53/265; B01D 53/62; B01D 53/78; B01D 53/96
See application file for complete search history.

(56) References Cited

U.S. PATENT DOCUMENTS

| | | | |
|---|---|---|---|
| 9,400,106 | B2 | 7/2016 | Iijima |
| 9,737,848 | B2 * | 8/2017 | Udatsu ............... B01D 53/1412 |
| 9,993,766 | B2 | 6/2018 | Chiba et al. |
| 2019/0270046 | A1 * | 9/2019 | Miyamoto ............. B01D 53/18 |

FOREIGN PATENT DOCUMENTS

| | | |
|---|---|---|
| JP | 2014-004578 A | 1/2014 |
| JP | 2016-093788 A | 5/2016 |
| JP | 2016-215174 A | 12/2016 |
| JP | 2018-187585 A | 11/2018 |
| WO | 2019-168180 A1 | 9/2019 |

\* cited by examiner

ABSORPTION LIQUID REGENERATION APPARATUS, $CO_2$ RECOVERY APPARATUS INCLUDING THE SAME, AND ABSORPTION LIQUID REGENERATION METHOD

TECHNICAL FIELD

The present disclosure relates to an absorption liquid regeneration apparatus, a $CO_2$ recovery apparatus including the same, and an absorption liquid regeneration method.

BACKGROUND ART

In recent years, vigorously studied is a method of recovering $CO_2$ in exhaust gas through gas-liquid contact between the exhaust gas and a $CO_2$ absorption liquid in a $CO_2$ recovery apparatus. The $CO_2$ absorption liquid after having absorbed $CO_2$ is supplied to an absorption liquid regeneration apparatus, and is regenerated so as to be reusable as a $CO_2$ absorption liquid.

For instance, Patent Document 1 describes a $CO_2$ recovery system where a $CO_2$ absorption liquid after having absorbed $CO_2$ in exhaust gas in an absorption tower is regenerated.

Specifically, in the $CO_2$ recovery system described in Patent Document 1, the $CO_2$ absorption liquid supplied from the absorption tower to a regeneration tower is heated by steam in the regeneration tower, and thereby releases gas containing $CO_2$, thus being regenerated. The released gas is separated into $CO_2$ gas and reflux water in a reflux water drum. The $CO_2$ gas released from the reflux water drum is supplied to a separator via a compressor and a cooler. In the separator, the $CO_2$ gas is separated into $CO_2$ gas and condensed water containing a small amount of $CO_2$ absorption agent, of which the condensed water is supplied to the bottom section of the regeneration tower. Accordingly, leakage of the $CO_2$ absorption liquid outside the system is suppressed, which makes it possible to regenerate the $CO_2$ absorption liquid effectively.

CITATION LIST

Patent Literature

Patent Document 1: U.S. Pat. No. 9,050,555B

SUMMARY

However, in the $CO_2$ recovery system in Patent Document 1, the gas-phase section of the reflux water drum contains the $CO_2$ absorption agent corresponding to the steam pressure, and thus an extremely small amount of $CO_2$ absorption agent exists in the gas phase also at the downstream of the flux water drum. Thus, in some cases, it may be difficult to maintain the concentration of the $CO_2$ absorption agent in product $CO_2$ that is finally obtained from the $CO_2$ recovery system to be not greater than a standard value.

Thus, in view of the above, an object of some embodiments of the present invention is to provide an absorption liquid regeneration apparatus and an absorption liquid regeneration method capable of effectively suppressing leakage of the $CO_2$ absorption agent outside the system.

(1) According to at least one embodiment of the present invention, an absorption liquid regeneration apparatus includes: a regeneration tower for regenerating a $CO_2$ absorption liquid; a reflux water drum configured to separate released gas from the regeneration tower into $CO_2$ gas and condensed water, and return the condensed water to the regeneration tower; and a cleaning part installed in a gas-phase part of the reflux water drum or in a $CO_2$ flow passage through which the $CO_2$ gas having flowed from the gas-phase part flows, and configured to remove a $CO_2$ absorption agent contained in the $CO_2$ gas by using a cleaning liquid. The cleaning liquid has a lower concentration of the $CO_2$ absorption agent than the condensed water stored in a liquid-phase part of the reflux water drum.

With the above configuration (1), a cleaning part is provided, which cleans $CO_2$ gas separated in the reflux water drum by using a cleaning liquid and remove a $CO_2$ absorption agent. Further, the cleaning liquid used in the cleaning part has a lower concentration of $CO_2$ absorption agent compared to the condensed water stored in the reflux water drum. Thus, it is possible to dissolve the $CO_2$ absorption agent contained in $CO_2$ gas effectively in the cleaning liquid. Accordingly, it is possible to suppress leakage of the $CO_2$ gas absorption agent outside the system effectively. Further, it is possible to reduce the concentration of the $CO_2$ absorption agent in the final product $CO_2$.

(2) In some embodiments, in the above configuration (1), the cleaning part is installed in the gas-phase part of the reflux water drum, and the absorption liquid regeneration apparatus further includes a cleaning liquid supply part configured to supply the cleaning part with the cleaning liquid, in the gas-phase part of the reflux water drum.

With the above configuration (2), it is possible to bring $CO_2$ and a cleaning liquid into gas-liquid contact with each other in the cleaning part. Further, by providing the cleaning part in the reflux water drum, it is possible to provide the cleaning part while saving space. Accordingly, it is possible to suppress leakage of the $CO_2$ absorption agent outside the system effectively while saving space on the basis of the principle described in the above (1).

(3) In some embodiments, in the above configuration (2), the absorption liquid regeneration apparatus further includes: a tray installed below the cleaning part in the gas-phase part of the reflux water drum, and configured to be capable of storing the cleaning liquid from the cleaning part; and a circulation line for circulating the cleaning liquid stored in the tray to the cleaning liquid supply part.

With the above configuration (3), it is possible to receive the cleaning liquid used in the cleaning part with a tray installed below the cleaning part. Further, the cleaning liquid stored in the tray is circulated to the cleaning-liquid supply part through the circulation line, and reused. As a result, it is possible to suppress leakage of the $CO_2$ absorption agent outside the system effectively, on the basis of the principle described in the above (1), while effectively re-utilizing the cleaning liquid.

(4) In some embodiments, in the above configuration (1), the absorption liquid regeneration apparatus further includes a cleaning drum installed in the $CO_2$ flow passage separately from the reflux water drum. The cleaning part is installed above a liquid pool part at the bottom of the cleaning drum, and the absorption liquid regeneration apparatus further comprises a cleaning liquid supply part configured to supply the cleaning liquid to the cleaning part of the cleaning drum.

With the above configuration (4), by providing the cleaning part in the cleaning drum provided separately from the reflux water drum, it is possible to ensure a sufficient capacity for the cleaning part to remove the remaining $CO_2$ gas absorption agent through gas-liquid contact between the $CO_2$ gas and the cleaning liquid. Accordingly, it is possible to suppress leakage of the $CO_2$ absorption agent outside the system even more effectively on the basis of the principle described in the above (1).

(5) In some embodiments, in the above configuration (4), the absorption liquid regeneration apparatus further includes a circulation line for circulating the cleaning liquid stored in the liquid pool part to the cleaning liquid supply part.

With the above configuration (5), it is possible to circulate the cleaning liquid stored in the liquid storage part to the cleaning-liquid supply part through the circulation line, and re-utilize the cleaning liquid to clean $CO_2$ gas in the cleaning part. As a result, it is possible to suppress leakage of the $CO_2$ absorption agent outside the system effectively, on the basis of the principle described in the above (1), while effectively re-utilizing the cleaning liquid.

(6) In some embodiments, in any one of the above configurations (1) to (5), the absorption liquid regeneration apparatus further includes: a compressor, installed in the $CO_2$ flow passage, for compressing the $CO_2$ gas; and a first cleaning liquid line configured to supply compressor condensed water from the compressor as the cleaning liquid toward the cleaning part.

With the above configuration (6), compressor condensed water is used as a cleaning liquid. As a result, it is possible to suppress leakage of the $CO_2$ absorption agent outside the system effectively while effectively using the resource inside the system of the absorption liquid regeneration apparatus, on the basis of the principle described in the above (1).

(7) In some embodiments, in the above configuration (6), the absorption liquid regeneration apparatus further includes a compressor condensed water drum, installed at the downstream of the compressor in the $CO_2$ flow passage, for storing the compressor condensed water separated from the $CO_2$ gas. The first cleaning liquid line is configured to supply the compressor condensed water in the compressor condensed water drum, as the cleaning liquid, toward the cleaning part.

With the above configuration (7), compressor condensed water stored in the compressor condensed water drum is used as a cleaning liquid. As a result, it is possible to suppress leakage of the $CO_2$ absorption agent outside the system effectively while effectively using the resource inside the system of the absorption liquid regeneration apparatus, on the basis of the principle described in the above (1).

(8) In some embodiments, in any one of the above configurations (1) to (7), the absorption liquid regeneration apparatus further includes a second cleaning liquid line configured to supply pure water as the cleaning liquid toward the cleaning part.

With the above configuration (8), pure water is used as a cleaning liquid, and thus it is possible to use a cleaning liquid not containing a $CO_2$ absorption agent for cleaning. Accordingly, it is possible to suppress leakage of the $CO_2$ absorption agent outside the system even more effectively on the basis of the principle described in the above (1).

Furthermore, it is possible to reduce the concentration of the $CO_2$ absorption agent in the final product $CO_2$ effectively. Thus, the above configuration (8) is effective, for instance, in a case where there is a strict standard for the concentration of the $CO_2$ absorption agent in the product $CO_2$.

(9) In some embodiments, in the above configuration (6) or (7), the absorption liquid regeneration apparatus further includes: a second cleaning liquid line configured to supply pure water as the cleaning liquid toward the cleaning part; and a line switching part configured to be capable of selecting a supply line of the cleaning liquid, so that the cleaning liquid from at least one of the first cleaning liquid line or the second cleaning liquid line is supplied to the cleaning part.

With the above configuration (9), with the line switching part, it is possible to select a cleaning liquid to be used, from the compressor condensed water, the pure water, or water mixture of the above.

For instance, in a case where the compressor condensed water is suitable for cleaning, it is possible to clean $CO_2$ gas efficiently by using the resource in the system of the absorption liquid regeneration apparatus by using the compressor condensed water in priority. Meanwhile, in a case where the pure water is suitable for cleaning, it is possible to reduce the concentration of the remaining $CO_2$ gas absorption agent in the product $CO_2$ further, by using the pure water in priority. Furthermore, in a case where the compressor condensed water has an increased concentration of the $CO_2$ absorption agent and is no longer suitable for cleaning of the $CO_2$ gas, pure water can be used as the cleaning liquid.

Accordingly, by selecting the cleaning liquid to be used suitably with the line switching part, it is possible to suppress leakage of the $CO_2$ absorption agent outside the system effectively while making effective use of the resource inside the system of the absorption liquid regeneration apparatus.

(10) According to at least one embodiment of the present invention, a $CO_2$ recovery apparatus includes: an absorption tower configured to remove the $CO_2$ gas by bringing the $CO_2$ absorption liquid and exhaust gas into contact with each other; and the absorption liquid regeneration apparatus according to any one of the above (1) to (9).

With the above configuration (10), it is possible to suppress leakage of the $CO_2$ absorption agent outside the system on the basis of the principle described in the above (1).

(11) According to at least one embodiment of the present invention, an absorption liquid regeneration method includes: regenerating a $CO_2$ absorption liquid in a regeneration tower; supplying released gas from the regeneration tower to a reflux water drum and separating the released gas into $CO_2$ gas and condensed water in the reflux water drum; and removing a $CO_2$ absorption agent contained in the $CO_2$ gas by contacting the $CO_2$ gas with a cleaning liquid, in a gas-phase part of the reflux water drum or a cleaning part installed in a $CO_2$ flow passage at the downstream of the gas-phase part. The cleaning liquid has a lower concentration of the $CO_2$ absorption agent than the condensed water stored in a liquid-phase part of the reflux water drum.

According to the above method (11), provided is a step of cleaning $CO_2$ gas separated in the reflux water drum by using a cleaning liquid and removing a $CO_2$ absorption agent. Further, the cleaning liquid used in the cleaning part has a lower concentration of $CO_2$ absorption agent compared to the condensed water stored in the reflux water drum. Thus, it is possible to dissolve the $CO_2$ absorption agent contained in $CO_2$ gas effectively in the cleaning liquid. Accordingly, it is possible to suppress leakage of the $CO_2$ gas absorption agent outside the system effectively. Further, it is possible to reduce the concentration of the $CO_2$ absorption agent in the final product $CO_2$.

(12) In some embodiments, in the above method (11), the cleaning part is installed in the gas-phase part of the reflux water drum, and the method further includes supplying the cleaning liquid to the cleaning part from a cleaning liquid supply part positioned above the cleaning part in the gas-phase part of the reflux water drum.

According to the above method (12), with the cleaning-liquid supply part provided above the cleaning part, it is possible to bring $CO_2$ and a cleaning liquid into gas-liquid contact with each other in the cleaning part. Further, by providing the cleaning part in the reflux water drum, it is possible to provide the cleaning part while saving space. Accordingly, it is possible to suppress leakage of the $CO_2$ absorption agent outside the system effectively while saving space on the basis of the principle described in the above (11).

(13) In some embodiments, the above method (12) further includes: storing the cleaning liquid from the cleaning part in a tray installed below the cleaning part in the gas-phase part of the reflux water drum; and circulating the cleaning liquid stored in the tray to the cleaning liquid supply part.

With the above configuration (13), it is possible to receive the cleaning liquid used in the cleaning part with a tray installed below the cleaning part. Further, the cleaning liquid stored in the tray is circulated to the cleaning-liquid supply part through the circulation line, and reused. As a result, it is possible to suppress leakage of the $CO_2$ absorption agent outside the system effectively, on the basis of the principle described in the above (11), while effectively re-utilizing the cleaning liquid.

(14) In some embodiments, any one of the above methods (11) to (13) further includes: compressing the $CO_2$ gas by using a compressor installed in the $CO_2$ flow passage; storing water separated from the $CO_2$ gas as compressor condensed water, by using a compressor condensed water drum installed at the downstream of the compressor in the $CO_2$ flow passage; and supplying the compressor condensed water inside the compressor condensed water drum to the cleaning part as the cleaning liquid, via a first cleaning liquid line.

With the above configuration (14), compressor condensed water in the compressor condensed water drum is used as a cleaning liquid. As a result, it is possible to suppress leakage of the $CO_2$ absorption agent outside the system effectively while effectively using the resource inside the system of the absorption liquid regeneration apparatus, on the basis of the principle described in the above (11).

(15) In some embodiments, the above method (14) further includes supplying pure water as the cleaning liquid toward the cleaning part via a second cleaning liquid; and selecting a supply line of the cleaning liquid so that the cleaning liquid from at least one of the first cleaning liquid line or the second cleaning liquid line is supplied to the cleaning part.

With the above configuration (15), with the line switching part, it is possible to select a cleaning liquid to be used, from the compressor condensed water, the pure water, or water mixture of the above.

For instance, in a case where the compressor condensed water is suitable for cleaning, it is possible to clean $CO_2$ gas efficiently by using the resource in the system of the absorption liquid regeneration apparatus by using the compressor condensed water in priority. Meanwhile, in a case where the pure water is suitable for cleaning, it is possible to reduce the concentration of the remaining $CO_2$ gas absorption agent in the product $CO_2$ further, by using the pure water in priority. Furthermore, in a case where the compressor condensed water has an increased concentration of the $CO_2$ absorption agent and is no longer suitable for cleaning of the $CO_2$ gas, the pure water can be used as the cleaning liquid.

Accordingly, by selecting the cleaning liquid to be used in the line switching part suitably, it is possible to suppress leakage of the $CO_2$ absorption agent outside the system effectively while making effective use of the resource inside the system of the absorption liquid regeneration apparatus.

According to some embodiments of the present invention, it is possible to suppress leakage of the $CO_2$ gas absorption agent outside the system effectively.

DETAILED DESCRIPTION

Embodiments of the present invention will now be described in detail with reference to the accompanying drawings.

However, the scope of the present invention is not limited to the following embodiments. It is intended that dimensions, materials, shapes, relative positions and the like of components described in the embodiments shall be interpreted as illustrative only and not intended to limit the scope of the present invention.

Figure 1:
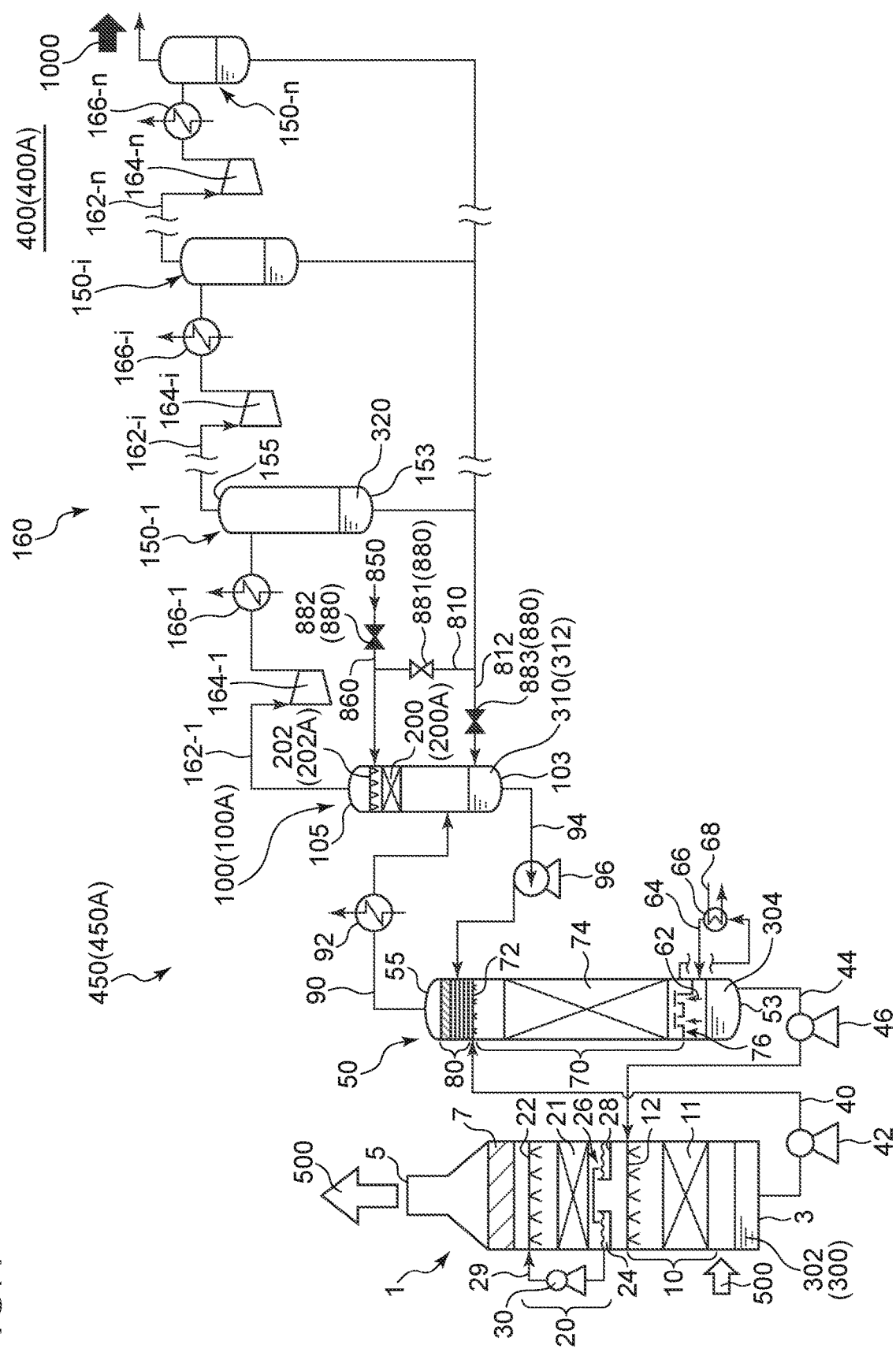
FIG. 1 is a schematic diagram showing the configuration of a $CO_2$ recovery apparatus according to an embodiment of the present invention, where a reflux water drum includes a cleaning part.
Figure 2:
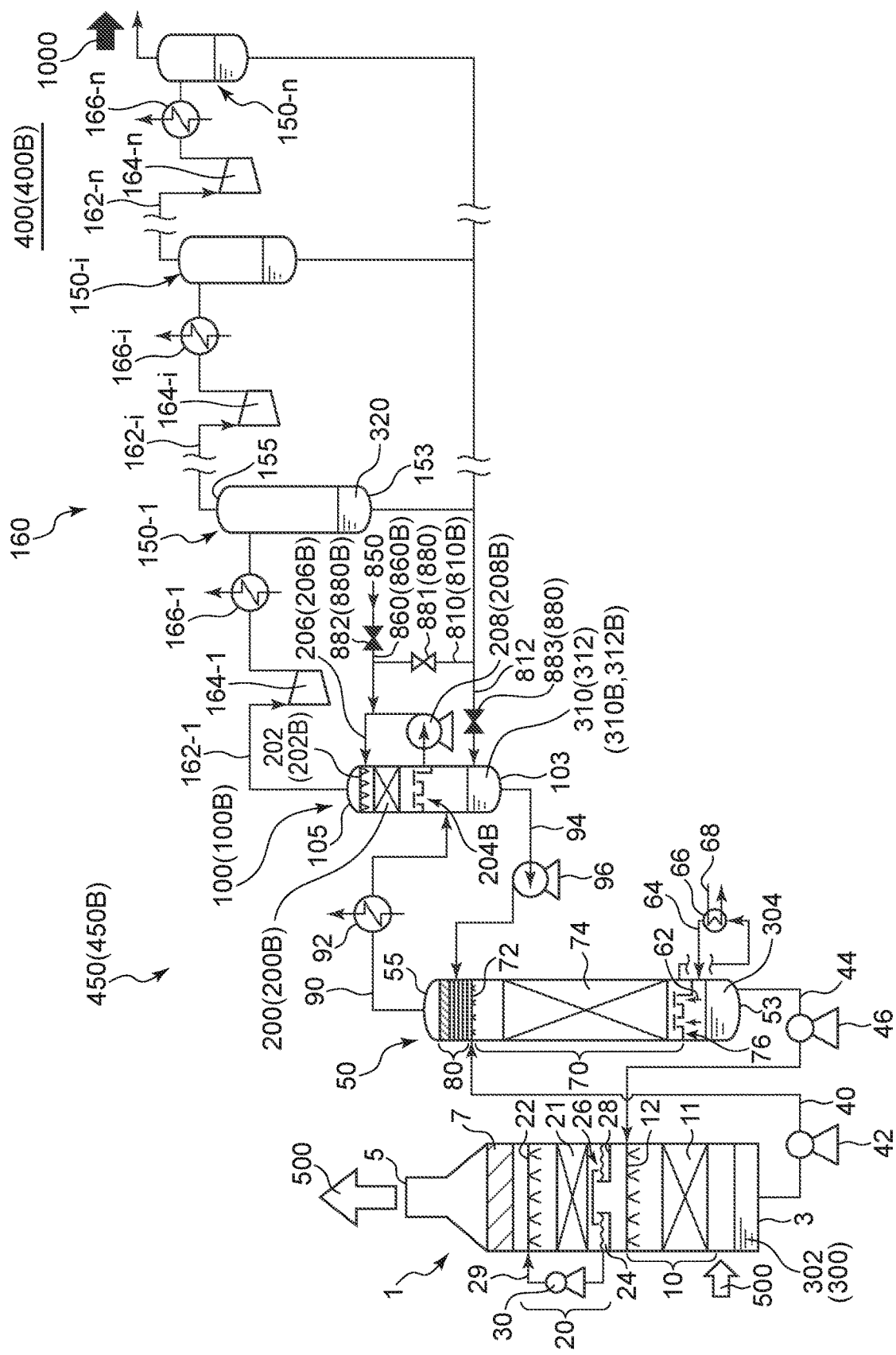
FIG. 2 is a schematic diagram of a configuration of a $CO_2$ recovery apparatus according to another embodiment of the present invention, where a reflux water drum includes a cleaning part and a circulation line.
Figure 3:
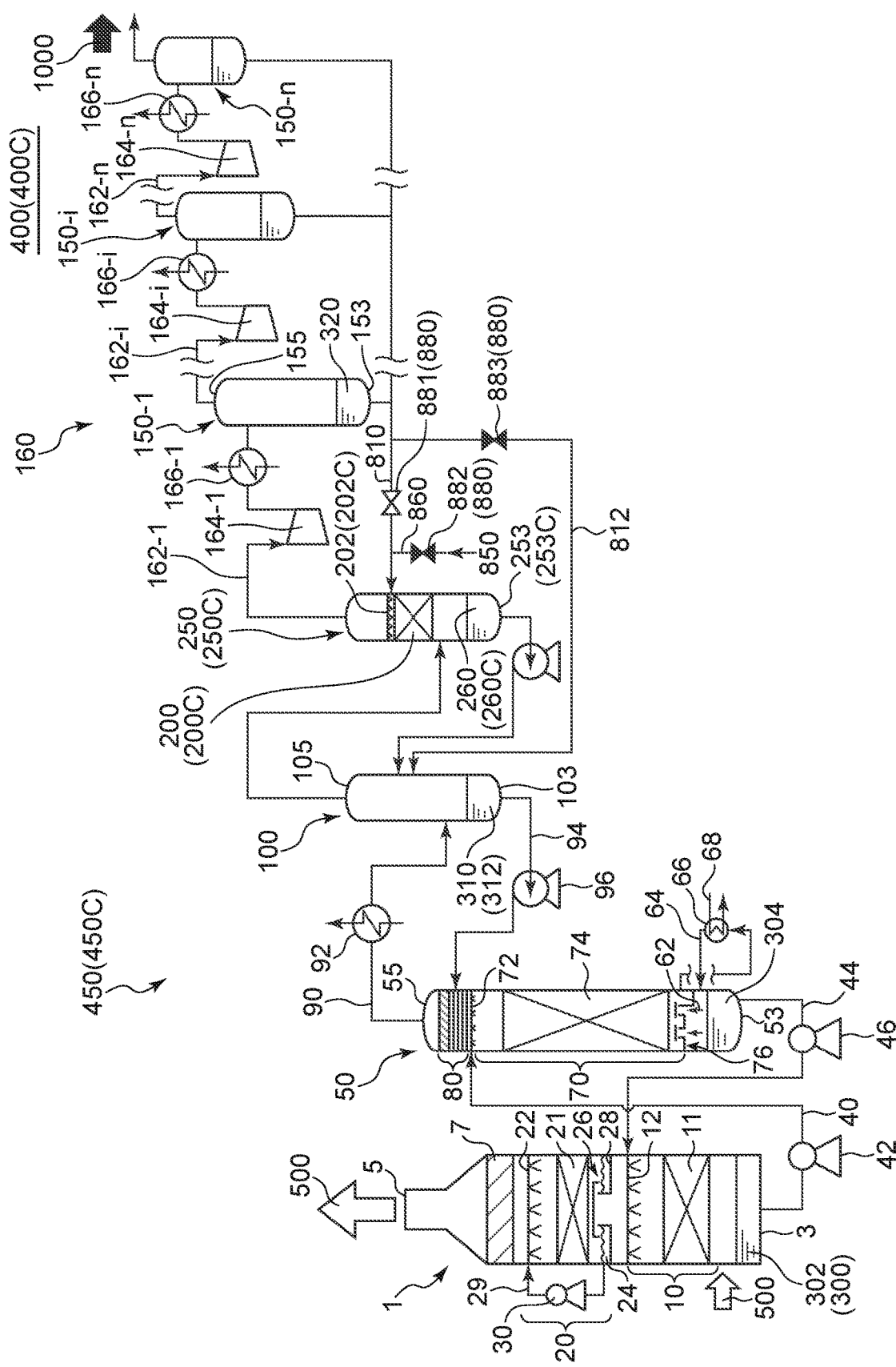
FIG. 3 is a schematic diagram showing the configuration of a $CO_2$ recovery apparatus according to an embodiment of the present invention, where a cleaning drum includes a cleaning part.
Figure 4:
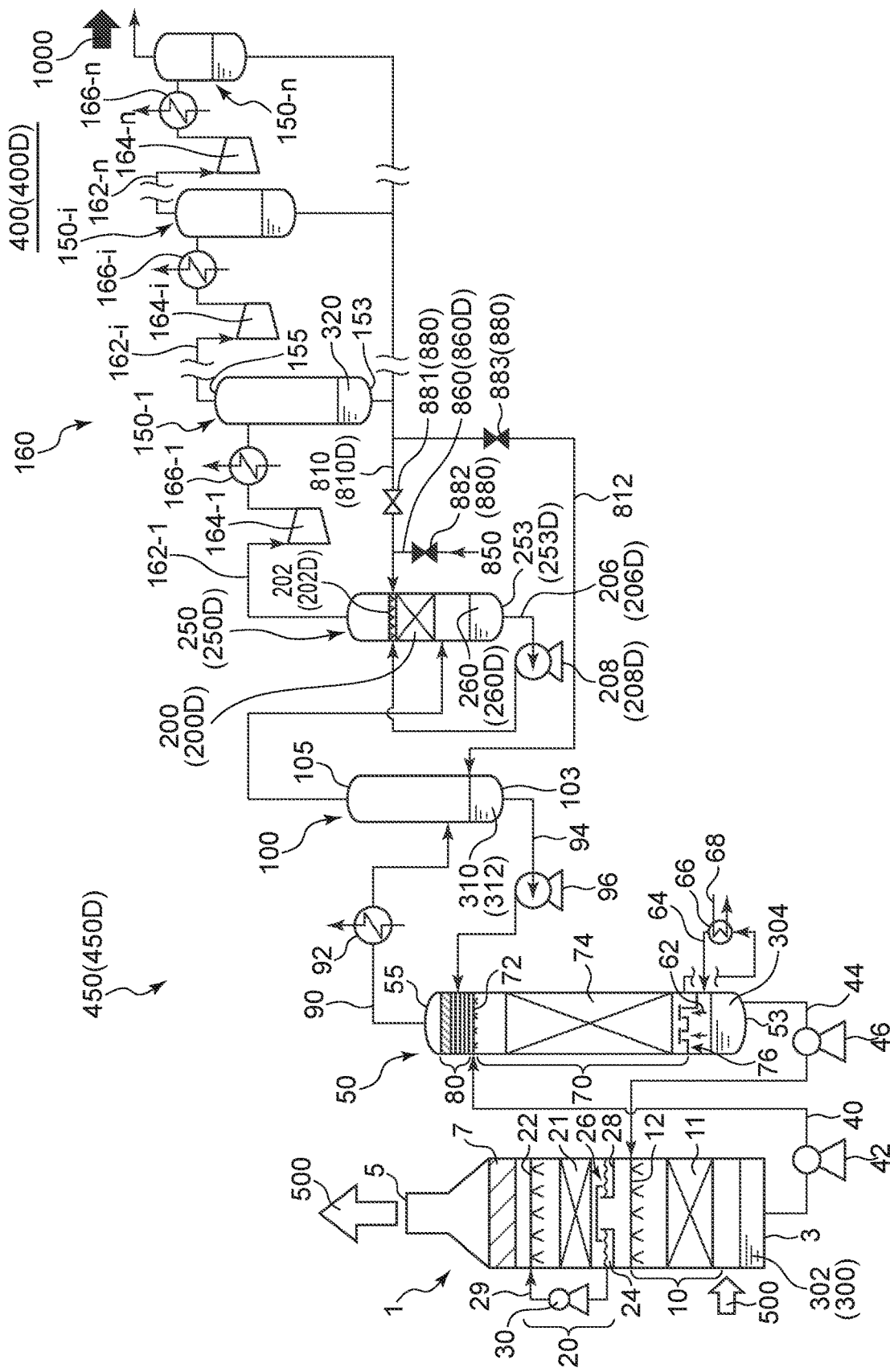
FIG. 4 is a schematic diagram of a configuration of a $CO_2$ recovery apparatus according to another embodiment of the present invention, where a reflux water drum includes a cleaning part and a circulation line.
Figure 5:
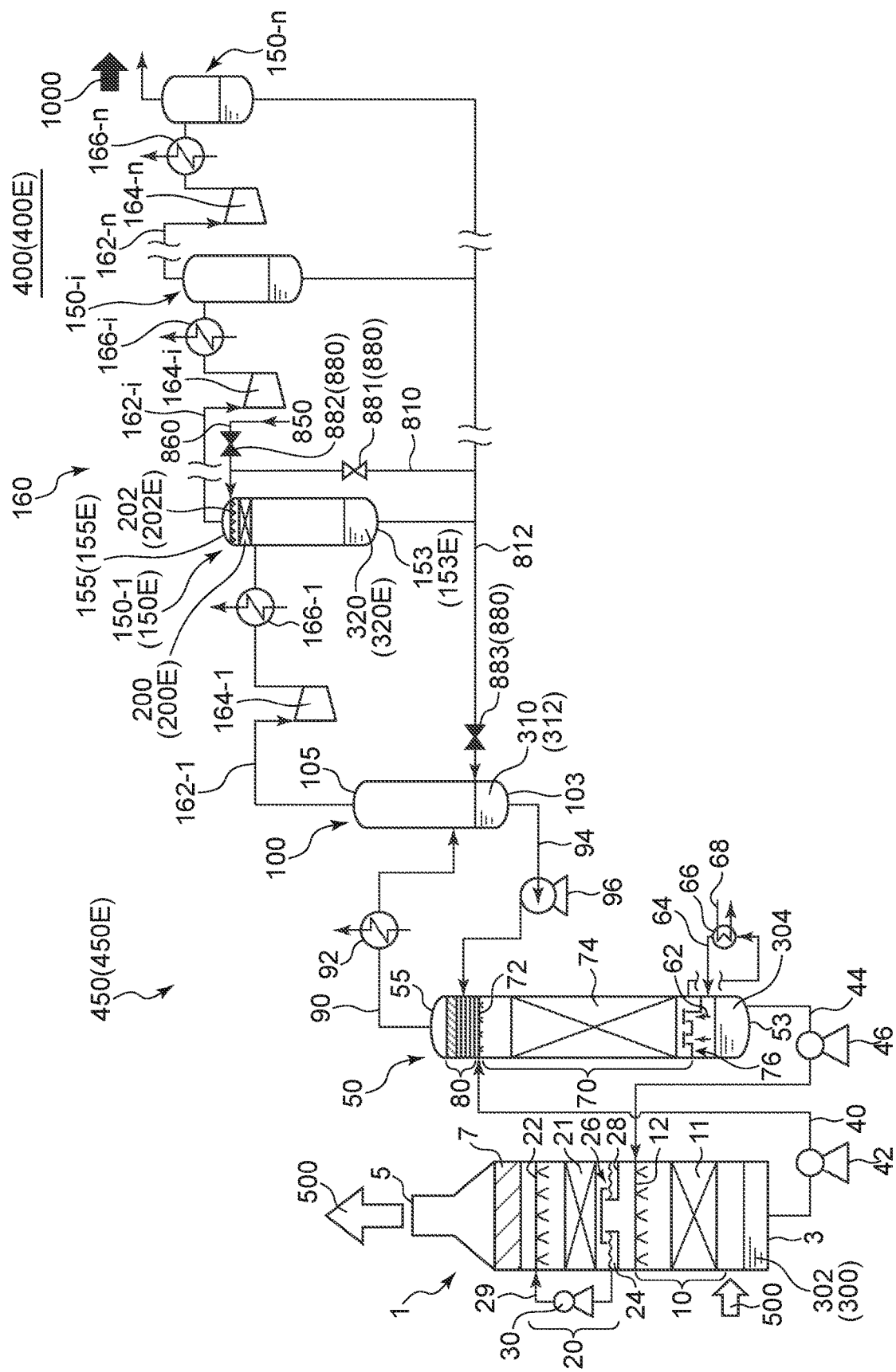
FIG. 5 is a schematic diagram showing the configuration of a $CO_2$ recovery apparatus according to an embodiment of the present invention, where a compressor condensed water drum includes a cleaning part.
Figure 6:
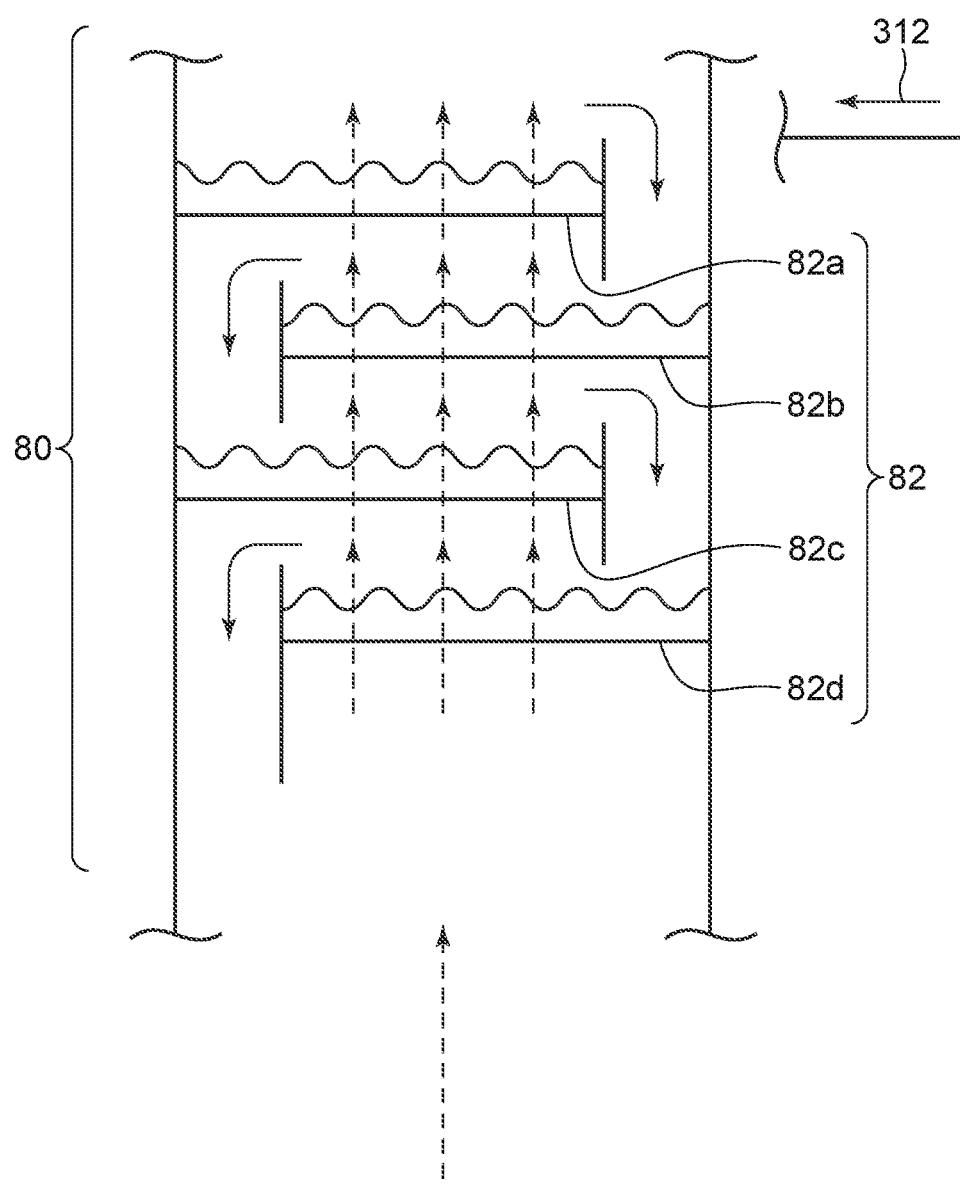
FIG. 6 is an enlarged schematic diagram of a reflux part of a regeneration tower according to an embodiment of the present invention.

FIG. 1 is a schematic diagram showing the configuration of a $CO_2$ recovery apparatus 400A according to an embodiment of the present invention, where a reflux water drum 100A includes a cleaning part 200A. FIG. 2 is a schematic diagram of a configuration of a $CO_2$ recovery apparatus 400B according to another embodiment of the present invention, where a reflux water drum 100B includes a cleaning part 200B and a circulation line 206B. FIG. 3 is a schematic diagram showing the configuration of a $CO_2$ recovery apparatus 400C according to an embodiment of the present invention, where a cleaning drum 250C includes a cleaning part 200C. FIG. 4 is a schematic diagram of a configuration of a $CO_2$ recovery apparatus 400D according to another embodiment of the present invention, where a reflux water drum 250D includes a cleaning part 200D and a circulation line 206D. FIG. 5 is a schematic diagram showing the configuration of a $CO_2$ recovery apparatus 400E according to an embodiment of the present invention, where a compressor condensed water drum 150E includes a cleaning part 200E. FIG. 6 is an enlarged schematic diagram of a reflux part 80 of a regeneration tower 50 according to an embodiment of the present invention.

In the following description, $CO_2$ recovery apparatuses 400A, 400B, 400C, 400D, and 400E may be collectively referred to as a $CO_2$ recovery apparatus 400.

According to some embodiments of the present invention, as depicted in FIGS. 1 to 5, the $CO_2$ recovery apparatus 400 includes an absorption tower 1, and an absorption liquid regeneration apparatus 450 for regenerating a $CO_2$ absorption liquid 300 (rich absorption liquid 302 described below) having absorbed $CO_2$ gas.

The $CO_2$ recovery apparatus 400 has a function to recover $CO_2$ gas in exhaust gas 500, through gas-liquid contact between exhaust gas 500 discharged from a factory or the like and the $CO_2$ absorption liquid 300 in the absorption tower 1. The $CO_2$ absorption liquid 300 (rich absorption liquid 302) having absorbed $CO_2$ gas is supplied to the absorption liquid regeneration apparatus 450.

The absorption liquid regeneration apparatus 450 includes a regeneration tower 50 which releases $CO_2$ gas from the $CO_2$ absorption liquid 300 having absorbed $CO_2$ gas (rich absorption liquid 302) and regenerate a $CO_2$ absorption liquid 300 to be reusable, and a reflux water drum 100 configured to separate the released gas from the regeneration tower 50 into $CO_2$ gas and condensed water 310, and return the condensed water 310 to the regeneration tower 50.

The $CO_2$ gas released from the absorption liquid regeneration apparatus 450 is compressed and cooled, and compressor condensed water 320 is removed from the $CO_2$ gas in the compressor condensed water drum 150. The $CO_2$ gas is compressed and cooled repeatedly in a plurality of stages, and the compressor condensed water 320 may be removed in the compressor condensed water drum 150 each time the $CO_2$ gas is compressed and cooled. The $CO_2$ gas after undergoing one or more stage of compression and cooling is taken out from the system as product $CO_2$ 1000.

As depicted in FIGS. 1 to 5, the absorption tower 1 includes an absorption part 10 that absorbs $CO_2$ gas in the exhaust gas 500, a water washing part 20 that water-washes the exhaust gas 500 from which $CO_2$ gas is removed, and a mist eliminator 7 that removes mist in the exhaust gas 500.

The exhaust gas 500 flows into the absorption tower 1 from below the absorption part 10, at the side of the tower bottom part 3 of the absorption tower 1. The exhaust gas 500 flows upward through the absorption tower 1 from the side of the tower bottom part 3 of the absorption tower 1, and flows into the absorption part 10.

The absorption part 10 includes a gas-liquid contact part 11 for bringing exhaust gas 500 into contact with the $CO_2$ absorption liquid 300 containing a $CO_2$ absorption agent, and a $CO_2$ absorption liquid supply part 12 installed above the gas-liquid contact part 11. The exhaust gas 500 performs counter-current contact with the $CO_2$ absorption liquid 300 supplied from above by the $CO_2$ absorption liquid supply part 12, in the gas-liquid contact part 11.

The gas-liquid contact part 11 is not particularly limited as long as it can promote gas-liquid contact between the $CO_2$ absorption liquid 300 and the exhaust gas 500. For instance, the gas-liquid contact part 11 may be formed by a packed layer packed with a packing material of a non-limited material, or may be formed by one or more stages of trays.

The type of the $CO_2$ absorption agent contained in the $CO_2$ absorption liquid 300 is not particularly limited. For instance, alkanolamines such as monoethanolamine and diethanolamine, or various alkaline aqueous solutions other than amines such as sodium hydroxide, potassium hydroxide and calcium hydroxide can be used the $CO_2$ absorption liquid 300.

Due to the reaction in the gas-liquid contact part 11, the $CO_2$ gas in the exhaust gas 500 is absorbed by the $CO_2$ absorption liquid 300. For instance, in a case where an amine is used as the $CO_2$ absorption agent, the absorption reaction of $CO_2$ gas is represented by a reaction expression $R\text{---}NH_2 + H_2O + CO_2 \rightarrow R\text{---}NH_3HCO_3$. As a result of the absorption reaction, most part of $CO_2$ gas is removed from the exhaust gas 500 flowing upward through the absorption tower 1 via the absorption part 10.

The $CO_2$ absorption liquid 300 having reacted with the $CO_2$ gas in the exhaust gas 500 in the gas-liquid contact part 11 falls onto the tower bottom part 3 of the absorption tower 1, and is stored in the tower bottom part 3. The $CO_2$ absorption liquid 300 stored in the tower bottom part 3 of the absorption tower 1 is referred to as a rich absorption liquid 302.

The rich absorption liquid 302 contains a great amount of $CO_2$ gas that is absorbed from the exhaust gas 500.

Meanwhile, exhaust gas 500 deprived of $CO_2$ gas through contact with the $CO_2$ absorption liquid 300 in the gas-liquid contact part 11 flows further upward through the absorption tower 1 toward the tower top part 5.

The exhaust gas 500 after having passed through the gas-liquid contact part 11 contains a $CO_2$ absorption agent, from the relationship of the saturated steam pressure at the temperature of the exhaust gas 500. Thus, to recover the $CO_2$ absorption agent contained in the exhaust gas 500 after passing through the gas-liquid contact part 11, the exhaust gas 500 may be water-washed by the water washing part 20 installed above the absorption part 10.

The water washing part 20 includes a gas-liquid contact part 21, a cleaning-water supply part 22 for supplying cleaning water 24 from above the gas-liquid contact part 21, and a chimney tray 26 installed below the gas-liquid contact part 21.

The exhaust gas 500 flows upward to the gas-liquid contact part 21 via the opening portion of the chimney tray 26, after passing through the absorption part 10. Further, while the chimney tray 26 is configured to permit a gas to pass through from the bottom toward the top via the opening portion, a liquid is not let through from the top toward the bottom.

In the gas-liquid contact part 21, the exhaust gas 500 having flown upward makes gas-liquid contact with the cleaning water 24 supplied from the cleaning-water supply part 22, and thereby the $CO_2$ absorption agent in the exhaust gas 500 dissolves in the cleaning water 24.

The water washing part 20 may further include a cleaning-water circulation line 29 for circulating the cleaning water 24, and a cleaning-water circulation pump 30 installed in the cleaning-water circulation line 29.

The cleaning water 24 after cleaning the exhaust gas 500 falls from the gas-liquid contact part 21, and is stored in the liquid storage part 28 of the chimney tray 26. The cleaning water 24 stored in the liquid storage part 28 is circulated by the cleaning-water circulation pump 30 via the cleaning-water circulation line 29, and is supplied again toward the gas-liquid contact part 21 from the cleaning-water supply part 22.

Further, while the absorption tower 1 includes a single stage of water washing part 20 in FIGS. 1 to 5, the absorption tower 1 may include a plurality of stages of water washing parts 20.

The exhaust gas 500 deprived of the $CO_2$ absorption agent in the water washing part 20 having the above configuration further flows upward through the absorption tower 1 toward the tower top part 5, and reaches the mist eliminator 7. The mist eliminator 7 captures mist in the exhaust gas 500.

The exhaust gas 500 deprived of mist by the mist eliminator 7 is discharged outside from the tower top part 5 of the absorption tower 1.

Next, described below in detail is the configuration of the absorption liquid regeneration apparatus 450 for regenerating the $CO_2$ absorption liquid 300 (rich absorption liquid 302) having absorbed $CO_2$ from the exhaust gas 500, in the absorption tower 1 having the above configuration.

The rich absorption liquid 302 is supplied to the rich absorption liquid supply part 72 installed on the side of the tower top part 55 of the regeneration tower 50, from the tower bottom part 3 of the absorption tower 1, by the rich absorption liquid circulation pump 42 installed in the rich absorption liquid supply line 40.

As depicted in FIGS. 1 to 5, the regeneration tower 50 includes a release part 70 that releases $CO_2$ gas from the rich absorption liquid 302 and a reflux part 80 which cleans the released $CO_2$ gas with the reflux water 312.

The release part 70 includes a rich absorption liquid supply part 72 for supplying the rich absorption liquid 302, and a charge part 74 which is installed below the rich absorption liquid supply part 72.

The rich absorption liquid 302 is supplied to the charge part 74 from above by the rich absorption liquid supply part 72.

The rich absorption liquid 302 is heated by the saturated steam 62 described below, in the charge part 74, releases $CO_2$ gas, and becomes a lean absorption liquid 304 which contains a relatively low rate of $CO_2$.

Below the charge part 74, installed is a chimney tray 76 for receiving the lean absorption liquid 304.

The lean absorption liquid 304 received by the chimney tray 76 is supplied through a re-boiler line 64, to a regeneration heater (re-boiler) 66 installed in the re-boiler line 64.

The regeneration heater 66 includes a line 68 for supplying a heating medium (e.g. saturated steam) to the regeneration heater 66. The lean absorption liquid 304 heated through heat exchange with the heating medium in the regeneration heater 66 at least partially changes in phase to the saturated steam 62, and is supplied to the lower section of the chimney tray 76 through the re-boiler line 64 in a gas-liquid phase mixed state. Accordingly, the saturated steam 62 produced by the regeneration heater 66 flows upward through the regeneration tower 50 to the charge part 74, via the chimney tray 76.

On the other hand, the lean absorption liquid 304 supplied to the lower section of the chimney tray 76 via the re-boiler line 64 (lean absorption liquid 304 that has not changed in phase in the regeneration heater 66) is stored in the tower bottom part 53 of the regeneration tower 50.

The lean absorption liquid 304 stored in the tower bottom part 53 is taken out from the tower bottom part 53 of the regeneration tower 50 through a lean liquid feeding line 44, and is fed to the $CO_2$ absorption liquid supply part 12 of the absorption tower 1 by the lean liquid feeding pump 46. The lean absorption liquid 304 returned to the $CO_2$ absorption liquid supply part 12 of the absorption tower 1 is reused as the above described $CO_2$ absorption liquid 300.

On the other hand, $CO_2$ gas released from the rich absorption liquid 302 at the release part 70 flows toward the reflux part 80 installed above the release part 70 in the regeneration tower 50.

As depicted in FIG. 6, the reflux part 80 of the regeneration tower 50 may include a plurality of stages of trays 82a to 82d.

The reflux water 312 described below flows through the trays 82a to 82d of the reflux part 80.

As depicted in FIG. 6, the $CO_2$ gas released at the release part 70 makes gas-liquid contact with the reflux water 312 flowing through the trays 82a to 82d of the reflux part 80 a plurality of times (herein, four times), and thereby the $CO_2$ absorption agent is removed, and the $CO_2$ gas is cleaned.

Further, although four stages of trays 82a to 82d are depicted in FIG. 6, the number of stages of trays is not particularly limited.

The $CO_2$ gas after passing through the reflux part 80 is released from the tower top part 55 of the regeneration tower 50, and is supplied to the $CO_2$ gas line 90.

The $CO_2$ gas is cooled by the condenser 92 in the $CO_2$ gas line 90. Accordingly, water vapor in the $CO_2$ gas is condensed.

The $CO_2$ gas after passing through the condenser 92 is separated into $CO_2$ gas and condensed water 310 in the reflux water drum 100 installed on the outlet side of the $CO_2$ gas line 90.

The condensed water 310 separated by the reflux water drum 100 is stored in the tower bottom part 103 of the reflux water drum 100.

The condensed water 310 stored in the tower bottom part 103 is sent to the reflux part 80 of the regeneration tower 50 as reflux water 312, via the reflux water feeding line 94. The reflux water 312 is fed by the reflux water circulation pump 96.

Furthermore, the $CO_2$ separated by the reflux water drum 100 is released from the tower top part 105 of the reflux water drum 100, and flows toward a post-treatment device 160.

The post-treatment device 160 includes gas supply lines 162 (the first gas supply line 162-1 to the n-th gas supply line 162-n), compressors 164 (the first compressor 164-1 to the n-th compressor 164-n) installed in the gas supply lines 162 for compressing $CO_2$ gas, coolers 166 (the first cooler 166-1 to the n-th cooler 166-n) that are installed at the downstream of the compressors 164 in the gas supply lines 162 to cool $CO_2$ gas, and compressor condensed water drums 150 (the first compressor condensed water drum 150-1 to the n-th compressor condensed water drum 150-n) installed on the outlet side of the gas supply lines 162 to remove moisture from the $CO_2$ gas.

N is an integer not less than one.

The first compressor 164-1 is installed most upstream of the plurality of compressors. The first cooler 166-1 is installed most upstream of the plurality of coolers. The first compressor condensed water drum 150-1 is installed most upstream of the plurality of compressor condensed water drums.

The $CO_2$ gas having flown into the post-treatment device 160 is compressed by the compressor 164, and is cooled by the cooler 166. Accordingly, moisture contained in the $CO_2$ gas is condensed. The step of separating the moisture with the compressor condensed water drum 150 and storing the moisture as compressor condensed water 320 in the tower bottom part 153 of the compressor condensed water drum 150 is repeated n times.

The $CO_2$ gas deprived of moisture is released from the tower top part 155 of the compressor condensed water drum 150.

After repeating compression and cooling of $CO_2$ gas n times, $CO_2$ gas is released from the tower top part 155 of the n-th compressor condensed water drum 150-n, and is taken out as product $CO_2$ 1000.

Described above is the overall configuration of the $CO_2$ recovery apparatus 400.

Next, with reference to FIGS. 1 to 5, the configuration of the cleaning part 200 of the $CO_2$ recovery apparatus 400 according to some embodiments of the present invention will be described.

As described above, the $CO_2$ absorption liquid 300 (rich absorption liquid 302) having absorbed $CO_2$ gas in the absorption tower 1 is regenerated in the regeneration tower 50. At this time, $CO_2$ gas is released from the rich absorption liquid 302. While the $CO_2$ gas released from the rich absorption liquid 302 is cleaned in the reflux part 80, it is difficult to recover the $CO_2$ absorption agent completely in the reflux part 80, and thus the $CO_2$ contains a small amount of $CO_2$ absorption agent. The $CO_2$ gas containing a small amount of $CO_2$ absorption agent is discharged from the regeneration tower 50, and is separated into $CO_2$ gas and condensed water 310 in the reflux water drum 100. At this time, a part of the $CO_2$ absorption agent moves toward the condensed water 310. Another part of the $CO_2$ absorption agent corresponding to the saturated steam pressure remains in the $CO_2$ gas at the gas-phase part of the reflux water drum 100.

Thus, the absorption liquid regeneration apparatus 450 (450A to 450E) according to some embodiments, as depicted in FIGS. 1 to 5, includes a cleaning part 200 (200A to 200E) that removes the remaining $CO_2$ absorption agent from the $CO_2$ gas separated in the reflux water drum 100.

The cleaning part 200 is installed in the gas-phase part of the reflux water drum 100, or in the $CO_2$ flow passage of $CO_2$ flowing out from the gas-phase part of the reflux water drum 100.

In the cleaning part 200, the $CO_2$ gas absorption agent contained in $CO_2$ gas is removed through gas-liquid contact between the $CO_2$ gas and a cleaning liquid. The cleaning liquid may be any liquid that has a lower concentration of $CO_2$ gas absorption agent compared to the condensed water 310 stored in the gas-phase part of the reflux water drum 100.

As described above, by cleaning the $CO_2$ gas by using a cleaning liquid having a relatively low concentration of $CO_2$ gas absorption agent, it is possible to effectively dissolve, in the cleaning liquid, the $CO_2$ gas absorption agent corresponding to the saturated steam pressure contained in the $CO_2$ gas after being separated from the condensed water 310 in the reflux water drum 100. Accordingly, it is possible to suppress leakage of the $CO_2$ gas absorption agent outside the system effectively.

The cleaning part 200 for cleaning the $CO_2$ gas may be installed on various positions as long as it is capable of cleaning $CO_2$ gas after being separated from the condensed water 310 in the reflux water drum 100.

For instance, as in the embodiment depicted in FIGS. 1 and 2, the cleaning part 200 (200A, 200B) may be installed in the gas-phase part of the reflux water drum 100 (100A, 100B). In this case, the absorption liquid regeneration apparatus 450 (450A, 450B) may include a cleaning-liquid supply part 202 (202A, 202B) for supplying a cleaning liquid to the cleaning part 200. The cleaning part 200 (200A, 200B) may be formed by the gas-liquid contact part installed below the cleaning-liquid supply part 202. The gas-liquid contact part constituting the cleaning part 200 is not particularly limited as long as it can promote gas-liquid contact. For instance, similarly to the gas-liquid contact part 11 of the absorption part 10, the gas-liquid contact part may be formed by a packed layer packed with a packing material of a non-limited material, or may be formed by one or more stages of trays.

As described above, by providing the cleaning part 200 (200A, 200B) inside the reflux water drum 100 (100A, 100B), it is possible to reduce the space for providing the cleaning part 200 and save the space.

Alternatively, as in another embodiment depicted in FIGS. 3 and 4, the cleaning part 200 (200C, 200D) may be installed inside the gas phase part of a cleaning drum 250 (250C, 250D) installed at the downstream of the reflux water drum 100, separately from the reflux water drum 100. In this case, the absorption liquid regeneration apparatus 450 (450C, 450D) may include a cleaning-liquid supply part 202 (202C, 202D) for supplying a cleaning liquid to the cleaning part 200, and the cleaning part 200 may be formed by a gas-liquid contact part installed below the cleaning-liquid supply part 202. The gas-liquid contact part as the cleaning part 200 may be formed by a packed layer packed with a packing material of a non-limited material, or may be formed by one or more stages of trays, as described above. The tower bottom part 253 (253C, 253D) of the cleaning drum 250 includes a liquid pool part 260 (260C, 260D) storing a cleaning liquid after cleaning $CO_2$ gas, formed therein.

As described above, by providing the cleaning part 200 (200C, 20D) in the cleaning drum 250 (250C, 250D) provided separately from the reflux water drum 100, it is possible to ensure a sufficient capacity for the gas-liquid contact part to remove the remaining $CO_2$ gas absorption agent through gas-liquid contact between the $CO_2$ gas and the cleaning liquid.

Further, the cleaning liquid stored in the liquid pool part 260 of the cleaning drum 250 may be returned to the upstream of the $CO_2$ recovery apparatus, instead of being discharged outside the system. For instance, in the example depicted in FIG. 3, the cleaning liquid of the liquid pool part 260C is fed to the reflux water drum 100C.

Further, as yet another example, like the absorption liquid regeneration apparatus 450E depicted in FIG. 5, the cleaning part 200E may be provided for the compressor condensed water drum 150E. In the example depicted in FIG. 5, the cleaning part 200E is provided for the first compressor condensed water drum 150-1. Nevertheless, the cleaning part 200E may be provided for any of the n compressor condensed water drums 150.

Furthermore, the cleaning liquid used in the cleaning part 200 of the above configuration may be circulated to the cleaning part 200 so as to be reusable, as depicted in FIGS. 2 and 4.

In an illustrative embodiment depicted in FIG. 2, the absorption liquid regeneration apparatus 450B includes a tray 204B installed below the cleaning part 200B, a circulation line 206B for circulating the cleaning liquid stored in the tray 204B to the cleaning-liquid supply part 202B, and a circulation pump 208B installed in the circulation line 206B.

The cleaning liquid supplied to the cleaning part 200B from the cleaning-liquid supply part 202B passes through the cleaning part 200B, and is stored in the tray 204B of the cleaning part 200B. The cleaning liquid stored in the tray 204B is returned to the cleaning-liquid supply part 202B via the circulation line 206B by the circulation pump 208B, and is used again to clean $CO_2$ gas.

By circulating the cleaning liquid as described above, it is possible to reuse the cleaning liquid effectively.

Furthermore, in an illustrative embodiment depicted in FIG. 4, the absorption liquid regeneration apparatus 450D includes a circulation line 206D for circulating the cleaning liquid, and a circulation pump 208B installed in the circulation line 206D.

The cleaning liquid stored in the liquid pool part 260D of the cleaning drum 250D is returned to the cleaning-liquid supply part 202D via the circulation line 206D by the circulation pump 208D, and is used again to clean $CO_2$ gas.

By circulating the cleaning liquid as described above, it is possible to reuse the cleaning liquid effectively.

Next, the configuration for supplying the cleaning liquid to the cleaning part 200 of the above configuration will be described.

The absorption liquid regeneration apparatus 450 according to some embodiments of the present invention may include a first cleaning-liquid line 810 configured to supply the compressor condensed water 320 inside the compressor condensed water drum 150 to the cleaning part 200 as a cleaning liquid, as depicted in FIGS. 1 to 5. The first cleaning-liquid line 810 supplies the compressor condensed water 320 to the cleaning part 200 from the tower bottom part 153 of the compressor condensed water drum 150.

The compressor condensed water 320 has a lower concentration of $CO_2$ absorption agent compared to the condensed water 310 stored in the liquid-phase part of the reflux water drum 100. Thus, as described above, by providing the first cleaning-liquid line 810, it is possible to make effective use of the compressor condensed water 320 as the cleaning liquid. Accordingly, it is possible to suppress leakage of the $CO_2$ absorption agent outside the system effectively by using a resource inside the system of the absorption liquid regeneration apparatus 450.

Furthermore, in a case where the compressor condensed water 320 is not entirely utilized as a cleaning liquid, the compressor condensed water 320 not used as a cleaning liquid may be returned to the reflux water drum 100.

Further, in the example shown in FIGS. 1 to 4, the first cleaning-liquid line 810 is provided for all of the compressor condensed water drums 150 including the first compressor condensed water drum 150-1 to the n-th compressor condensed water drum 150-n. Nevertheless, the present invention is not limited to this, and the first cleaning-liquid line 810 may be provided for only a particular compressor condensed water drum 150.

As depicted in FIGS. 1, 3, and 5, in the absorption liquid regeneration apparatus 450 (450A, 450C, 450E) not provided with the circulation line 206, the first cleaning-liquid line 810 is configured to supply the compressor condensed water 320 to the cleaning-liquid supply part 202.

In contrast, as depicted in FIG. 2, in the absorption liquid regeneration apparatus 450B provided with the circulation line 206B, the first cleaning-liquid line 810 may be configured to supply the compressor condensed water 320 to the cleaning-liquid supply part 202B, or to the tray 204B. Furthermore, as depicted in FIG. 4, in the absorption liquid regeneration apparatus 450D provided with the circulation line 206D, the first cleaning-liquid line 810D may be configured to supply the compressor condensed water 320 to the cleaning-liquid supply part 202D, or to the liquid pool part 260D.

In another embodiment, instead of the condensed water 320, or together with the compressor condensed water 320, pure water supplied from outside may be used as a cleaning liquid.

In the embodiment depicted in FIGS. 1 to 5, the absorption liquid regeneration apparatus 450 (450A to 450E) includes a second cleaning-liquid line 860 configured to supply pure water 850 as a cleaning liquid toward the cleaning part 200.

Since pure water 850 substantially does not contain a $CO_2$ gas absorption agent, it is possible to clean $CO_2$ gas even more effectively by using pure water 850 as a cleaning liquid.

Furthermore, as depicted in FIGS. 1, 3, and 5, in the absorption liquid regeneration apparatus 450 (450A, 450C, 450E) not provided with the circulation line 206, the second cleaning-liquid line 860 is configured to supply the pure water 850 to the cleaning-liquid supply part 202.

Meanwhile, as depicted in FIG. 2, in the absorption liquid regeneration apparatus 450B provided with the circulation line 206B, the second cleaning-liquid line 860B may be configured to supply the pure water 850 to the cleaning-liquid supply part 202B, or to the tray 204B. Furthermore, as depicted in FIG. 4, in the absorption liquid regeneration apparatus 450D provided with the circulation line 206D, the second cleaning-liquid line 860D may be configured to supply the pure water 850 to the cleaning-liquid supply part 202D, or to the liquid pool part 260D.

Further, in a case where the absorption liquid regeneration apparatus 450 includes both of the first cleaning-liquid line 810 and the second cleaning-liquid line 860 described above, the absorption liquid regeneration apparatus 450 may be configured such that either one of the lines is selectable for supply of the cleaning liquid.

The absorption liquid regeneration apparatus 450 depicted in FIGS. 1 to 5 includes a line switching part 880 configured to be capable of selecting a supply line for a cleaning liquid, such that a cleaning liquid from at least one of the first cleaning-liquid line 810 or the second cleaning-liquid line 860 is supplied to the cleaning part 200.

Accordingly, with the line switching part 880, it is possible to select a cleaning liquid to be used, from the compressor condensed water 320, the pure water 850, or water mixture of the above.

For instance, in a case where the compressor condensed water 320 is suitable for cleaning, it is possible to clean $CO_2$ gas efficiently by using the resource in the system of the absorption liquid regeneration apparatus 450 by using the compressor condensed water 320 in priority. Meanwhile, in a case where the pure water 850 is suitable for cleaning, it is possible to reduce the concentration of the remaining $CO_2$ gas absorption agent of the product $CO_2$ 1000 further, by using the pure water 850 in priority. Furthermore, in a case where the compressor condensed water 320 has an increased concentration of the $CO_2$ absorption agent and is no longer suitable for cleaning of the $CO_2$ gas, the pure water 850 can be used as the cleaning liquid.

The line switching part 880 depicted in FIGS. 1 to 5 includes a first valve 881 installed in the first cleaning-liquid line 810, and a second valve 882 installed in the second cleaning-liquid line 860.

Furthermore, the above described line switching part 880 further includes a third valve 883 branched from the first cleaning-liquid line 810 and installed in a return line 812 connected to the reflux water drum 100.

By operating the first valve 881, the second valve 882, and the third valve 883 suitably, it is possible to adjust the supply amount of each of the compressor condensed water 320 and the pure water 850 to the cleaning part 200.

In a case where only the compressor condensed water 320 is used as the cleaning liquid, the opening degree of the first valve 881 is adjusted to supply an appropriate amount of the compressor condensed water 320 to the cleaning part 200, while the second valve 882 is closed. Furthermore, the opening degree of the third valve 883 is adjusted suitably so as to return an excess portion of the compressor condensed water 320 that is not used as the cleaning liquid to the reflux water drum 100. Furthermore, in a case where the entire amount of the compressor condensed water 320 is supplied to the cleaning part 200 as the cleaning liquid, the third valve 883 is closed.

In a case where mixture of the compressor condensed water 320 and the pure water 850 is used as a cleaning liquid, the opening degrees of the first valve 881 and the second valve 882 are adjusted, so that the mixing ratio of the compressor condensed water 320 and the pure water 850 becomes a predetermined value, and so that an appropriate amount of the cleaning liquid is supplied to the cleaning part. Furthermore, the opening degree of the third valve 883 is adjusted suitably so as to return an excess portion of the compressor condensed water 320 that is not used as the cleaning liquid to the reflux water drum 100. Furthermore, in a case where the entire amount of the compressor condensed water 320 is supplied to the cleaning part 200 as the cleaning liquid, the third valve 883 is closed.

In a case where only the compressor condensed water 320 is used as the cleaning liquid, the opening degree of the second valve 882 is adjusted to supply an appropriate amount of the pure water 850 to the cleaning part 200, while the first valve 881 is closed. Furthermore, the third valve 883 is opened so as to return the compressor condensed water 320 to the reflux water drum 100.

Accordingly, by selecting the cleaning liquid to be used in the line switching part 880 suitably, it is possible to suppress leakage of the $CO_2$ absorption agent outside the system effectively while making effective use of the resource inside the system of the absorption liquid regeneration apparatus 450.

Next, the method of regenerating the $CO_2$ absorption liquid having absorbed $CO_2$ gas will be described.

Furthermore, the method of regenerating the $CO_2$ absorption liquid described below may be performed by using the above described $CO_2$ recovery apparatus 400.

In some embodiments, the method of regenerating the $CO_2$ absorption liquid includes a step S1 of regenerating the $CO_2$ absorption liquid 300 in the regeneration tower 50, a step S2 of supplying released gas from the regeneration tower 50 to the reflux water drum 100 and separating the released gas into $CO_2$ gas and condensed water 310 in the reflux water drum 100, and a step S3 of bringing $CO_2$ gas into contact with a cleaning liquid in the gas-phase part of the reflux water drum 100 or the cleaning part 200 installed in the $CO_2$ flow path of the $CO_2$ gas that has flown out from the gas phase part and removing the $CO_2$ absorption agent contained in the $CO_2$ gas.

The cleaning liquid used to clean $CO_2$ gas has a lower concentration of $CO_2$ absorption agent compared to the condensed water 310 stored in the liquid-phase part of the reflux water drum 100.

Accordingly, it is possible to suppress leakage of the $CO_2$ absorption agent outside the system effectively, by cleaning the $CO_2$ gas in the cleaning part 200 (step S3).

Furthermore, cleaning of the $CO_2$ gas using the cleaning liquid in step S3 may be performed at various positions as long as it is possible to clean $CO_2$ gas after being separated from the condensed water 310 in the reflux water drum 100.

For instance, as depicted in FIGS. 1 and 2, the $CO_2$ gas may be cleaned at the cleaning part 200 (200A, 200B) installed in the gas-phase part of the reflux water drum 100. In this case, the cleaning liquid may be supplied to the cleaning part 200 from the cleaning-liquid supply part 202 positioned above the cleaning part 200 in the gas-phase part of the reflux water drum 100 (step S4).

Alternatively, the $CO_2$ gas may be cleaned in the cleaning part 200 (200C, 200D) installed in the gas-phase part of the cleaning drum 250 (250C, 250D) provided separately from the reflux water drum 100, or in the cleaning part 200E installed in any one of the compressor condensed water drums 150E, as depicted in FIG. 5.

Furthermore, in a case where the $CO_2$ gas is cleaned in the cleaning part 200B in the gas-phase part of the reflux water drum 100, the tray 204B installed below the cleaning part 200 may store the cleaning liquid from the cleaning part 200 (step S5), and the cleaning liquid stored in the tray 204B may be circulated to the cleaning-liquid supply part 202 (step S6).

Furthermore, the cleaning liquid used in the cleaning part 200 in step S3 may be at least one of the compressor condensed water 320 inside the compressor condensed water drum 150, or the pure water 850 supplied from outside.

In some embodiments, as depicted in FIGS. 1 to 5, the compressor condensed water 320 separated from the $CO_2$ gas may be supplied to the cleaning part 200 from the compressor condensed water drum 150 via the first cleaning-liquid line 810, and the compressor condensed water 320 may be utilized as a cleaning liquid.

Furthermore, by using the line switching part 880, at least one of the first cleaning-liquid line 810 or the second cleaning-liquid line 860 may be selected as the cleaning-liquid supply line. By selecting the cleaning liquid to be used in the line switching part 880 suitably, it is possible to suppress leakage of the $CO_2$ absorption agent outside the system effectively while making effective use of the resource inside the system of the absorption liquid regeneration apparatus 450.

The embodiments of the present invention have been described above. However, the present invention is not limited thereto, and various modifications may be applied as long as they do not depart from the object of the present invention.

DESCRIPTION OF REFERENCE NUMERALS

1 Absorption tower
3 Tower bottom part
5 Tower top part
7 Mist eliminator
10 Absorption part
11 Gas-liquid contact part
12 $CO_2$ absorption liquid supply part
20 Water washing part
21 Gas-liquid contact part
22 Cleaning-water supply part
24 Cleaning water
26 Chimney tray
28 Liquid storage part
29 Cleaning-water circulation line
30 Cleaning-water circulation pump
40 Rich absorption liquid supply line
42 Rich absorption liquid circulation pump
44 Lean liquid feeding line
46 Lean liquid feeding pump
50 Regeneration tower
53 Tower bottom part
55 Tower top part
62 Saturated steam
64 Re-boiler line
66 Regeneration heater
68 Line
70 Release part
72 Rich absorption liquid supply part
74 Charge part 76 Chimney tray
80 Reflux part
82 (82a to 82d) Tray
90 $CO_2$ gas line
92 Condenser
94 Reflux water feeding line
96 Reflux water circulation pump
100 Reflux water drum
103 Tower bottom part
105 Tower top part
150 Compressor condensed water drum
153 Tower bottom part
155 Tower top part
160 Post-treatment device
162 Gas supply line
164 Compressor
166 Cooler
200 Cleaning part
202 Cleaning-liquid supply part
204B Tray
206 Circulation line
208B, 208D Circulation pump
250 Cleaning drum
253 Tower bottom part
260 Liquid pool part
300 $CO_2$ absorption liquid
302 Rich absorption liquid
304 Lean absorption liquid
310 Condensed water
312 Reflux water
320 Condensed water
400 Recovery apparatus
450 Absorption liquid regeneration apparatus
500 Exhaust gas
810 First cleaning-liquid line
812 Return line
850 Pure water
860 Second cleaning-liquid line
880 Line switching part
881 First valve
882 Second valve
883 Third valve
1000 Product $CO_2$

The invention claimed is:

1. An absorption liquid regeneration apparatus, comprising:
a regeneration tower for regenerating a $CO_2$ absorption liquid;
a reflux water drum configured to separate released gas from the regeneration tower into $CO_2$ gas and condensed water, and return the condensed water to the regeneration tower; and
a cleaning part installed in a gas-phase part of the reflux water drum and configured to remove a $CO_2$ absorption agent contained in the $CO_2$ gas by using a cleaning liquid,
wherein the cleaning liquid has a lower concentration of the $CO_2$ absorption agent than the condensed water stored in a liquid-phase part of the reflux water drum.

2. The absorption liquid regeneration apparatus according to claim 1,
further comprising a second cleaning liquid line configured to supply pure water as the cleaning liquid toward the cleaning part.

3. The absorption liquid regeneration apparatus according to claim 1, comprising a condenser for condensing water vapor contained in the released gas from the regeneration tower to generate condensed water,
wherein the reflux water drum is configured to separate the condensed water generated by the condenser from $CO_2$ gas in the released gas and return the condensed water to the regeneration tower.

4. The absorption liquid regeneration apparatus according to claim 1,
wherein the absorption liquid regeneration apparatus further comprises a cleaning liquid supply part configured to supply the cleaning part with the cleaning liquid, in the gas-phase part of the reflux water drum.

5. The absorption liquid regeneration apparatus according to claim 4, further comprising:
a tray installed below the cleaning part in the gas-phase part of the reflux water drum, and configured to be capable of storing the cleaning liquid from the cleaning part; and
a circulation line for circulating the cleaning liquid stored in the tray to the cleaning liquid supply part.

6. An absorption liquid regeneration apparatus comprising:
a regeneration tower for regenerating a $CO_2$ absorption liquid;
a reflux water drum configured to separate released gas from the regeneration tower into $CO_2$ gas and condensed water, and return the condensed water to the regeneration tower; and
a cleaning part installed in a gas-phase part of the reflux water drum or in a $CO_2$ flow passage at the downstream of the gas-phase part of the reflux water drum, and configured to remove a $CO_2$ absorption agent contained in the $CO_2$ gas by using a cleaning liquid,
wherein the cleaning liquid has a lower concentration of the $CO_2$ absorption agent than the condensed water stored in a liquid-phase part of the reflux water drum,
the absorption apparatus further comprising:
a compressor, installed in the $CO_2$ flow passage, for compressing the $CO_2$ gas; and
a first cleaning liquid line configured to supply compressor condensed water from the compressor as the cleaning liquid toward the cleaning part.

7. The absorption liquid regeneration apparatus according to claim 6,
further comprising a compressor condensed water drum, installed at the downstream of the compressor in the $CO_2$ flow passage, for storing the compressor condensed water separated from the $CO_2$ gas,
wherein the first cleaning liquid line is configured to supply the compressor condensed water in the compressor condensed water drum as the cleaning liquid toward the cleaning part.

8. The absorption liquid regeneration apparatus according to claim 6, further comprising:
a second cleaning liquid line configured to supply pure water as the cleaning liquid toward the cleaning part; and
a line switching part configured to be capable of selecting a supply line of the cleaning liquid, so that the cleaning liquid from at least one of the first cleaning liquid line or the second cleaning liquid line is supplied to the cleaning part.

9. The absorption liquid regeneration apparatus according to claim 6,
further comprising a cleaning drum installed in the $CO_2$ flow passage separately from the reflux water drum, wherein the cleaning part is installed above a liquid pool part at the bottom of the cleaning drum, and wherein the absorption liquid regeneration apparatus further comprises a cleaning liquid supply part configured to supply the cleaning liquid to the cleaning part of the cleaning drum.

10. The absorption liquid regeneration apparatus according to claim 9, further comprising a circulation line for circulating the cleaning liquid stored in the liquid pool part to the cleaning liquid supply part.

11. A $CO_2$ recovery apparatus, comprising:

an absorption tower configured to remove the $CO_2$ gas by bringing the $CO_2$ absorption liquid and exhaust gas into contact with each other; and the absorption liquid regeneration apparatus according to claim 1.

* * * * *